US011630071B2

(12) United States Patent
Noda et al.

(10) Patent No.: US 11,630,071 B2
(45) Date of Patent: Apr. 18, 2023

(54) ANALYSIS METHOD AND ANALYSIS DEVICE

(71) Applicant: Otsuka Pharmaceutical Co., Ltd., Tokyo (JP)

(72) Inventors: Tetsuya Noda, Hino (JP); Masanao Majima, Hino (JP); Yuuya Shouji, Hachioji (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 420 days.

(21) Appl. No.: 16/645,619

(22) PCT Filed: Jun. 22, 2018

(86) PCT No.: PCT/JP2018/023895
§ 371 (c)(1),
(2) Date: Mar. 9, 2020

(87) PCT Pub. No.: WO2019/064754
PCT Pub. Date: Apr. 4, 2019

(65) Prior Publication Data
US 2020/0271593 A1    Aug. 27, 2020

(30) Foreign Application Priority Data

Sep. 26, 2017  (JP) .............................. JP2017-184914

(51) Int. Cl.
*G01N 21/94* (2006.01)
*G01N 21/552* (2014.01)
(Continued)

(52) U.S. Cl.
CPC .......... *G01N 21/94* (2013.01); *G01N 21/553* (2013.01); *G01N 21/6428* (2013.01); *G01N 21/958* (2013.01); *G01N 2021/6439* (2013.01)

(58) Field of Classification Search
CPC ......... G01N 2021/6439; G01N 21/553; G01N 21/6428; G01N 21/648; G01N 21/94; G01N 21/958
(Continued)

(56) References Cited

U.S. PATENT DOCUMENTS 10,031,460 B2 * 7/2018 Hano ................. G03G 15/5062
10,648,914 B2   5/2020 Nagai et al.
(Continued)

FOREIGN PATENT DOCUMENTS

JP    S51-49779 A    4/1976
JP    2006177852 A   7/2006
(Continued)

OTHER PUBLICATIONS

EPO, Office Action for the corresponding European Application No. 18862564.4, dated Apr. 19, 2022.
(Continued)

*Primary Examiner* — Sunghee Y Gray
(74) *Attorney, Agent, or Firm* — Lucas & Mercanti, LLP

(57) ABSTRACT

An analysis method for detecting an amount of a substance by irradiating an analysis chip containing the substance and detecting a quantity of light output from the analysis chip. The analysis method including irradiating an incident surface of the analysis chip and another surface adjacent to the incident surface with detection light while changing a relative position of the detection light with respect to the analysis chip, detecting reflected light from the incident surface of the analysis chip, and acquiring information on a position of the analysis chip from a relationship between a quantity of the reflected light detected and the relative position. The analysis method determines if the analysis chip is abnormal when a quantity of target reflected light is equal to or lower than a predetermined light quantity.

17 Claims, 7 Drawing Sheets

(51) Int. Cl.
  *G01N 21/64* (2006.01)
  *G01N 21/958* (2006.01)
(58) Field of Classification Search
  USPC .......................................................... 436/501
  See application file for complete search history.

(56) References Cited

U.S. PATENT DOCUMENTS

| | | | | |
|---|---|---|---|---|
| 2018/0313756 | A1* | 11/2018 | Yamauchi | G01N 21/41 |
| 2018/0321152 | A1 | 11/2018 | Nagai et al. | |
| 2019/0285545 | A1* | 9/2019 | Nagai | G01N 21/13 |
| 2019/0360934 | A1* | 11/2019 | Nakamura | G01N 21/648 |
| 2020/0271593 | A1* | 8/2020 | Noda | G01N 21/94 |

FOREIGN PATENT DOCUMENTS

| | | |
|---|---|---|
| JP | 2009080291 A | 4/2009 |
| JP | 2013-002858 A | 1/2013 |
| WO | 2014/171139 A1 | 10/2014 |
| WO | 2015/064704 A1 | 5/2015 |
| WO | 2017/082043 A1 | 5/2017 |
| WO | 2017/082089 A1 | 5/2017 |

OTHER PUBLICATIONS

PCT, International Search Report for the corresponding application No. PCT/JP2018/023895, dated Sep. 18, 2018, with English translation.

PCT, Written Opinion of the International Searching Authority for the corresponding application No. PCT/JP2018/023895, dated Sep. 18, 2018, with English translation.

PCT, International Preliminary Report on Patentability for the corresponding application No. PCT/JP2018/023895, dated Mar. 31, 2020, with English translation.

EPO, Extended European Search Report for the corresponding European Application No. 18862564.4, dated Apr. 22, 2020.

* cited by examiner

ANALYSIS METHOD AND ANALYSIS DEVICE

CROSS REFERENCE TO RELATED APPLICATION

This Application is a 371 of PCT/JP2018/023895 filed on Jun. 22, 2018, which, in turn, claimed the priority of Japanese Patent Application No. 2017-184914 filed on Sep. 26, 2017, both applications are incorporated herein by reference.

TECHNICAL FIELD

The present invention relates to an analysis method and an analysis device for detecting a substance to be detected, contained in a sample solution by using, for example, Surface Plasmon Resonance (SPR).

BACKGROUND ART

If a very small amount of substance to be detected can be quantitatively detected with high sensitivity in measurement for detecting biological substances such as proteins and DNA, it becomes possible to immediately grasp the condition of a patient and provide treatment. For this reason, there is a demand for an analysis method and an analysis device for quantitatively detecting weak light derived from a very small amount of substance to be detected, with high sensitivity. The surface plasmon resonance fluorescence analysis method (Surface Plasmon-field enhanced Fluorescence Spectroscopy (SPFS)) is known as a method for detecting a substance to be detected with high sensitivity (see, for example, Patent Literature 1).

A prism with a metal film disposed on a predetermined surface is used in SPFS. Then, when the metal film is irradiated with excitation light from an excitation light irradiation unit through the prism at an angle at which surface plasmon resonance occurs, localized-field light (enhanced electric field) can be generated on the surface of the metal film. This localized-field light excites a fluorescent substance that labels a substance to be detected captured on the metal film. Therefore, it is possible to detect the presence of the substance to be detected or the amount thereof by detecting fluorescence emitted from the fluorescent substance.

CITATION LIST

Patent Literature

Patent Literature 1: WO 2015/064704 A

SUMMARY OF INVENTION

Technical Problem

Incidentally, a sensor chip to be used for SPFS is generally stored under refrigeration in an individual package. Then, in the case of measurement, a user takes the sensor chip out of a refrigerator in advance, opens the individual package after the temperature of the sensor chip returns to room temperature (normal temperature), and place the sensor chip on a conveyance stage. Here, there is a problem that if the sensor chip is opened before returning to room temperature, condensation or a mist is formed on the sensor chip due to a difference in temperature or humidity between the inside of the refrigerator and the room, resulting in detection of an abnormal measurement result.

In addition, there is a possibility that even in the case where the sensor chip is opened after normally returning to room temperature, an abnormal measurement result may be detected if the sensor chip gets dirty or scratched as a result of, for example, being accidentally touched by the user's hand.

An object of the present invention is to provide an analysis method and an analysis device that can easily prevent an abnormal measurement result from being detected.

Solution to Problem

In order to solve the above-described problems, the present invention includes the following matters.

An analysis method for detecting an amount of a substance to be measured by irradiating an analysis chip containing the substance to be measured with detection light and detecting a quantity of light output from the analysis chip, the analysis method including:

a step of irradiating an incident surface of the analysis chip and another surface adjacent to the incident surface with the detection light while changing a relative position of the detection light with respect to the analysis chip, detecting reflected light from the incident surface of the analysis chip, and acquiring information on a position of the analysis chip from a relationship between a quantity of the reflected light detected and the relative position, the analysis method further including:

an abnormality determination step of determining that the analysis chip is abnormal in the case where a quantity of target reflected light is equal to or lower than a predetermined light quantity, the quantity of the target reflected light being a light quantity to be detected when the analysis chip is located at a position where a total beam diameter of the detection light is incident on the incident surface.

An analysis device that includes an irradiation part that emits detection light, and detects an amount of a substance to be measured by causing the irradiation part to irradiate an analysis chip containing the substance to be measured with the detection light and detecting light output from the analysis chip, the analysis device including:

a conveyance part that changes a relative position of the detection light with respect to the analysis chip;

a detection part that detects reflected light from an incident surface of the analysis chip while causing the conveyance part to change the relative position and causing the irradiation part to irradiate the incident surface of the analysis chip and another surface adjacent to the incident surface with the detection light;

a position information acquisition part that acquires information on a position of the analysis chip from a relationship between a quantity of the reflected light detected and the relative position; and an abnormality determination part that determines that the analysis chip is abnormal in the case where a quantity of target reflected light is equal to or lower than a predetermined light quantity, the quantity of the target reflected light being a light quantity to be detected when the conveyance part locates the analysis chip at a position where a total beam diameter of the detection light is incident on the incident surface.

Advantageous Effects of Invention

According to the present invention, it is possible to provide an analysis method and an analysis device that can easily prevent an abnormal measurement result from being detected.

DESCRIPTION OF EMBODIMENTS

Figure 1:
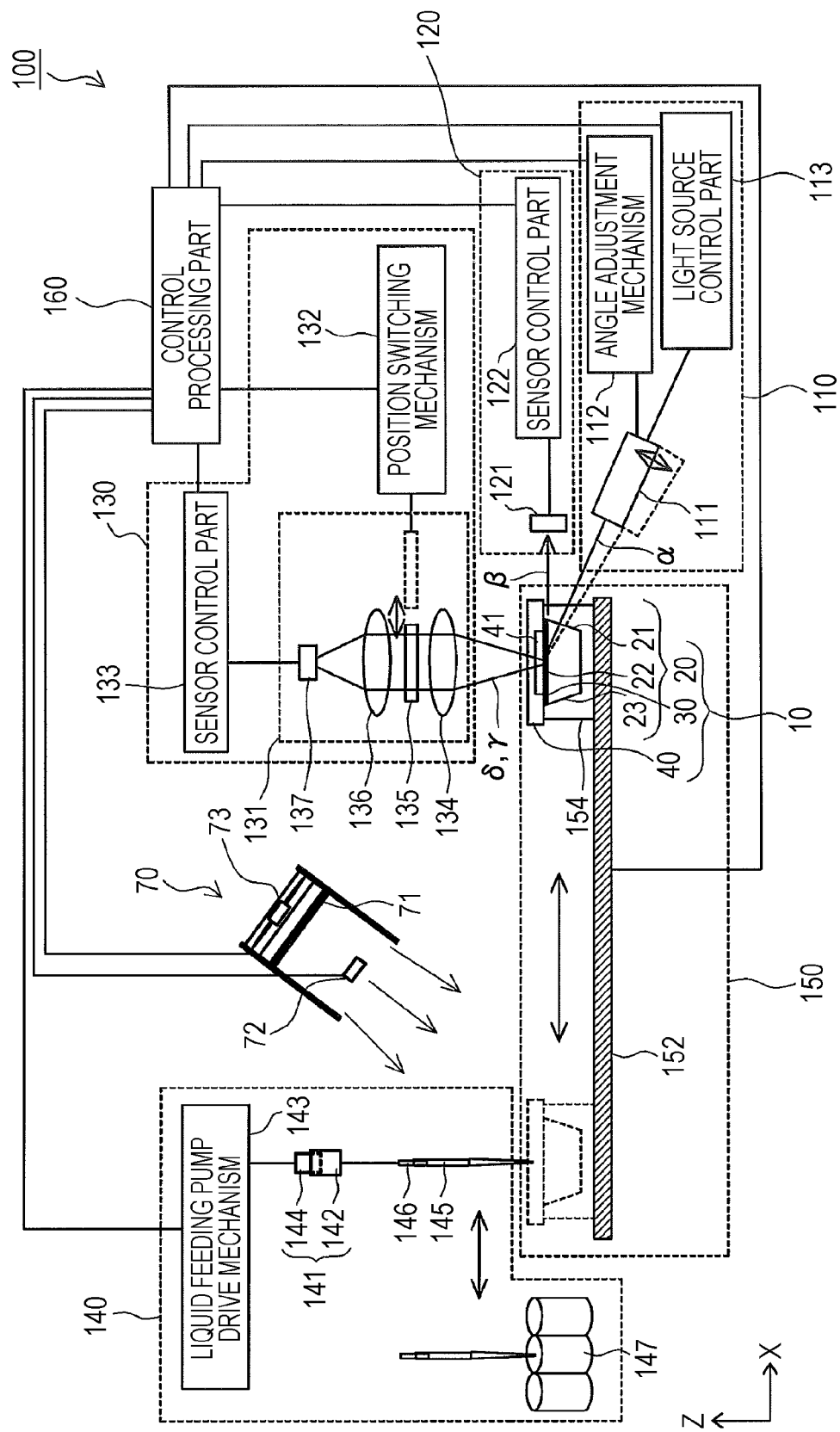
FIG. 1 is a diagram schematically illustrating a configuration of an SPFS device according to an embodiment.

An analysis device according to an embodiment will be described below with reference to the drawings, taking as an example an SPFS device that detects a substance to be detected, contained in a sample solution by using the surface plasmon resonance fluorescence analysis method. FIG. 1 is a schematic diagram illustrating a configuration of an SPFS device (analysis device) 100 according to an embodiment of the present invention. As illustrated in FIG. 1, the SPFS device 100 includes an excitation light irradiation unit (irradiation part) 110, an excitation light detection unit (detection part) 120, a fluorescence detection unit 130, a liquid feeding unit 140, a conveyance unit (conveyance part) 150, and a control processing part (abnormality determination part) 160. The SPFS device 100 is used with an analysis chip 10 attached to a chip holder 154 of the conveyance unit 150. Therefore, the analysis chip 10 will be described first, and then each constituent element of the SPFS device 100 will be described.

(Configuration of Detection Chip)

The analysis chip 10 includes a prism 20, a metal film 30, and a flow path lid 40. The prism 20 has an incident surface 21, a film formation surface 22, and an output surface 23. The metal film 30 is formed on the film formation surface 22. The flow path lid 40 is disposed on the film formation surface 22 or the metal film 30. Generally, the analysis chip 10 is replaced for each analysis. The analysis chip 10 is preferably a structure formed of sides each having a length of several millimeters to several centimeters. Meanwhile, the analysis chip 10 may be a smaller structure or a larger structure not included in the category of "chip".

The prism 20 is made of a dielectric that is transparent to excitation light (detection light) $\alpha$. The prism 20 has the incident surface 21, the film formation surface 22, and the output surface 23. The incident surface 21 causes most of the excitation light $\alpha$ from the excitation light irradiation unit 110 to enter the prism 20, and reflects a part of the excitation light $\alpha$ from the excitation light irradiation unit 110. The ratio (reflectance) of the quantity of the excitation light $\alpha$ reflected by the incident surface 21 (hereinafter also referred to as "reflected light $\beta$") to the excitation light $\alpha$ from the excitation light irradiation unit 110 is determined according to the refractive index of the prism 20, the refractive index of gas around the prism 20, and the incident angle of the excitation light $\alpha$ with respect to the incident surface 21.

Generally, the prism 20 is surrounded by air. Thus, the reflectance is substantially constant as long as the prism 20 is made of the same material and the excitation light $\alpha$ is incident on the prism 20 at the same incident angle. For example, in the case where the material of the prism 20 is a resin having a refractive index of 1.4 to 1.6, the reflectance is approximately 4.2%. The metal film 30 is disposed on the film formation surface 22. The excitation light $\alpha$ having entered the prism 20 is reflected from the back surface of the metal film 30. More specifically, the excitation light $\alpha$ is reflected by an interface (film formation surface 22) between the prism 20 and the metal film 30. The excitation light $\alpha$ reflected by the metal film 30 is output from the output surface 23 to the outside of the prism 20.

The shape of the prism 20 is not particularly limited. In the present embodiment, the prism 20 has a rectangular column shape with a trapezoidal bottom. A surface corresponding to one base of the trapezoid is the film formation surface 22. A surface corresponding to one leg is the incident surface 21, and a surface corresponding to the other leg is the output surface 23. The trapezoid serving as the bottom is preferably an isosceles trapezoid. As a result, the incident surface 21 and the output surface 23 are symmetric, so that the S-wave component of the excitation light $\alpha$ is less likely to stay in the prism 20.

The incident surface 21 is formed such that the excitation light $\alpha$ does not return to the excitation light irradiation unit 110. In the case where the light source of the excitation light $\alpha$ is a laser diode (hereinafter also referred to as "LD"), if the excitation light $\alpha$ returns to the LD, the excitation state of the LD is disturbed, and the wavelength and output of the excitation light $\alpha$ vary. Therefore, the angle of the incident surface 21 is set such that the excitation light $\alpha$ is not perpendicularly incident on the incident surface 21 in a scanning range centered on an ideal enhancement angle. Here, the "enhancement angle" refers to an incident angle at which the quantity of scattering light (hereinafter referred to as "plasmon scattering light") $\delta$ is maximized in the case of scanning the incident angle of the excitation light $\alpha$ with respect to the metal film 30. The scattering light $\delta$ has the same wavelength as the excitation light $\alpha$, and is emitted upward from the analysis chip 10. In the present embodiment, the angle between the incident surface 21 and the film formation surface 22 and the angle between the film formation surface 22 and the output surface 23 are both approximately 80°.

Note that the enhancement angle (and a resonance angle extremely close thereto) is basically determined by the design of the analysis chip 10. Design factors include the refractive index of the prism 20, the refractive index of the metal film 30, the thickness of the metal film 30, the extinction coefficient of the metal film 30, the wavelength of the excitation light $\alpha$, and the like. The enhancement angle and the resonance angle shift depending on a substance to be detected immobilized on the metal film 30. However, the shift amount is less than a few degrees. Here, the "resonance angle" refers to an incident angle at which the quantity of reflected light (not illustrated) reflected by the film formation surface 22 and output from the output surface 23 is minimized in the case of scanning the incident angle of the excitation light α with respect to the metal film 30.

The prism 20 has considerable birefringence properties. Examples of the material of the prism 20 include resin and glass. Examples of the resin forming the prism 20 include polymethyl methacrylate (PMMA), polycarbonate (PC), and cycloolefin-based polymer. The material of the prism 20 is preferably a resin having a refractive index of 1.4 to 1.6 and a small birefringence.

The metal film 30 is disposed on the film formation surface 22 of the prism 20. As a result, there occurs an interaction (surface plasmon resonance) between a photon of the excitation light α incident on the film formation surface 22 under the total reflection condition and a free electron in the metal film 30. Thus, localized-field light can be generated on the surface of the metal film 30.

As long as the metal film 30 is made of a metal that can cause surface plasmon resonance, the material of the metal film 30 is not particularly limited. Examples of the material of the metal film 30 include gold, silver, copper, aluminum, and alloys thereof. In the present embodiment, the metal film 30 is a gold thin film. The method for forming the metal film 30 is not particularly limited. Examples of the method for forming the metal film 30 include sputtering, vapor deposition, and plating. The thickness of the metal film 30 is not particularly limited, but is preferably in the range of 30 to 70 nm.

In addition, although not illustrated in FIG. 1, a capturing body for capturing a substance to be detected is immobilized on a face of the metal film 30 not facing the prism 20 (the surface of the metal film 30). It becomes possible to selectively detect the substance to be detected by immobilizing the capturing body. In the present embodiment, the capturing body is uniformly immobilized in a predetermined region (reaction field) on the metal film 30. The type of capturing body is not particularly limited as long as the capturing body can capture the substance to be detected. In the present embodiment, the capturing body is an antibody or a fragment thereof that can specifically bind to the substance to be detected. In the reaction field, there are performed reactions such as bonding of the capturing body and the substance to be detected (primary reaction) and fluorescent labeling of the substance to be detected (secondary reaction).

The flow path lid 40 is disposed on the metal film 30. In the case where the metal film 30 is formed only on a part of the film formation surface 22 of the prism 20, the flow path lid 40 may be disposed on the film formation surface 22. A flow path groove is formed in the back surface of the flow path lid 40. Thus, the flow path lid 40, together with the metal film 30 (and the prism 20), forms a flow path 41 through which liquid flows. The capturing body immobilized on the metal film 30 is exposed in the flow path 41. Both ends of the flow path 41 are connected to an inlet and an outlet (not illustrated) formed on the upper surface of the flow path lid 40, respectively. When liquid is injected into the flow path 41, the liquid comes into contact with the capturing body.

The flow path lid 40 is preferably made of a material that is transparent to light (fluorescence γ and plasmon scattering light δ) emitted from the metal film 30. Examples of the material of the flow path lid 40 include resin. As long as the flow path lid 40 is transparent to these kinds of light, the other part of the flow path lid 40 may be formed of an opaque material. The flow path lid 40 is joined to the metal film 30 or the prism 20 by, for example, adhesion using a double-sided tape, an adhesive, or the like, laser welding, ultrasonic welding, or pressure bonding using a clamp member.

The type of liquid to flow through the flow path 41 is not particularly limited. Examples of the types of liquid include a specimen containing a substance to be detected, a fluorescent labeling solution containing a fluorescent substance, and a buffer solution. There are no particular limitations on the type of specimen and the type of substance to be detected. Examples of specimens include body fluids such as blood, serum, plasma, urine, nasal mucus, saliva, and semen, and diluted solutions thereof. Examples of substances to be detected include nucleic acids (such as DNA and RNA), proteins (such as polypeptides and oligopeptides), amino acids, glucides, lipids, and modifying molecules thereof.

As illustrated in FIG. 1, most of the excitation light α enters the prism 20 from the incident surface 21. At this time, a part of the excitation light α is reflected by the incident surface 21 to become the reflected light β. The excitation light α having entered the prism 20 is incident on the metal film 30 at a total reflection angle (an angle at which surface plasmon resonance occurs). It is possible to generate localized-field light (generally also referred to as "evanescent light" or "near-field light") on the metal film 30 by thus irradiating the metal film 30 with the excitation light α at an angle at which surface plasmon resonance occurs. This localized-field light excites a fluorescent substance that labels the substance to be detected present on the metal film 30, so that fluorescence γ is emitted. The SPFS device 100 detects the presence or amount of the substance to be detected by detecting the light quantity (intensity) of the fluorescence γ emitted from the fluorescent substance. Furthermore, as described later in detail, the SPFS device 100 can detect an abnormality in the analysis chip 10 while adjusting the position of the analysis chip 10, by detecting the quantity (intensity) of the reflected light β.

(Configuration of SPFS Device)

Next, each constituent element of the SPFS device 100 will be described. As described above, the SPFS device (analysis device) 100 includes the excitation light irradiation unit (irradiation part) 110, the excitation light detection unit (detection part) 120, the fluorescence detection unit 130, the liquid feeding unit 140, the conveyance unit (conveyance part) 150, and the control processing part (abnormality determination part) 160.

The excitation light irradiation unit 110 applies the excitation light α to the analysis chip 10 held by the chip holder 154. At the time of detecting the fluorescence γ, the excitation light irradiation unit 110 emits only P-waves for the metal film 30 toward the incident surface 21 such that the P-waves are incident on the metal film 30 at an angle at which surface plasmon resonance occurs. Here, the "excitation light" refers to light that directly or indirectly excites a fluorescent substance. For example, the excitation light α is light that generates localized-field light, which excites the fluorescent substance, on the surface of the metal film 30 when applied to the metal film 30 through the prism 20 at an angle at which surface plasmon resonance occurs. In the SPFS device 100 according to the present embodiment, the excitation light α is also used in positioning the analysis chip 10 and detecting an abnormality.

The excitation light irradiation unit 110 includes a configuration for emitting the excitation light α toward the prism 20 and a configuration for scanning the incident angle of the excitation light α with respect to the back surface of the metal film 30. In the present embodiment, the excitation light irradiation unit 110 includes a light source unit 111, an angle adjustment mechanism 112, and a light source control part 113.

The light source unit 111 emits the collimated excitation light α having a constant wavelength and light quantity (intensity) such that the shape of an irradiation spot on the back surface of the metal film 30 is substantially circular. The light source unit 111 includes, for example, a light source of the excitation light α, a beam shaping optical system, and a temperature adjustment mechanism (all not illustrated).

The type of light source is not particularly limited. However, the light source is preferably a high-power light source from the viewpoint of using, as a second light receiving sensor 137, a photodetector that does not have high sensitivity, such as a photodiode (PD). In the present embodiment, the light source is a laser diode (LD). Other examples of light sources include light emitting diodes, mercury lamps, and other laser light sources. In the case where light emitted from the light source is not a beam, the light emitted from the light source is converted into a beam by a lens, a mirror, a slit, or the like. Furthermore, in the case where light emitted from the light source is not monochromatic light, the light emitted from the light source is converted into monochromatic light by a diffraction grating or the like. Moreover, in the case where light emitted from the light source is not linearly polarized light, the light emitted from the light source is converted into linearly polarized light by a polarizer or the like.

The beam shaping optical system includes, for example, a collimator, a band-pass filter, a linear polarization filter, a half-wave plate, a slit, and a zoom means. The beam shaping optical system may include all of these elements or some of these elements.

The collimator collimates the excitation light α emitted from the light source.

The band-pass filter turns the excitation light α emitted from the light source into narrowband light having only the center wavelength. This is because the excitation light α from the light source has some wavelength distribution width.

The linear polarization filter turns the excitation light α emitted from the light source into completely linearly polarized light. The half-wave plate adjusts the polarization direction of the excitation light α such that the P-wave component is incident on the metal film 30.

The slit and the zoom means adjust the beam diameter, contour shape, and the like of the excitation light α such that the shape of the irradiation spot on the back surface of the metal film 30 becomes a circle of a predetermined size.

The temperature adjustment mechanism is, for example, a heater or a Peltier element. The wavelength and energy of light emitted from the light source may vary depending on temperature. Therefore, the temperature adjustment mechanism keeps the temperature of the light source constant to control the wavelength and energy of the light emitted from the light source such that the wavelength and energy thereof are kept constant.

The angle adjustment mechanism 112 adjusts the angle at which the excitation light α is incident on the metal film 30 (the interface (film formation surface 22) between the prism 20 and the metal film 30). The angle adjustment mechanism 112 relatively rotates the optical axis of the excitation light α and the chip holder 154 so as to apply the excitation light α toward a predetermined position on the metal film 30 through the prism 20 at a predetermined incident angle.

For example, the angle adjustment mechanism 112 rotates the light source unit 111 around an axis (an axis perpendicular to the paper surface of FIG. 1) orthogonal to the optical axis of the excitation light α. At this time, the position of the rotation axis is set such that the position of the irradiation spot on the metal film 30 hardly changes even when the incident angle is scanned. The position of the rotation center is set in the vicinity of the intersection of the optical axes of two beams of the excitation light α at both ends of the scanning range of the incident angle (between an irradiation position on the film formation surface 22 and the incident surface 21). As a result, a shift in the irradiation position can be minimized.

As described above, the enhancement angle refers to an angle at which the maximum quantity of the plasmon scattering light δ can be achieved, among angles at which the excitation light α is incident on the metal film 30. It becomes possible to detect the fluorescence γ of high intensity by setting the incident angle of the excitation light α to the enhancement angle or an angle close thereto. Note that the basic incidence conditions of the excitation light α are determined by, for example, the material and shape of the prism 20 of the analysis chip 10, the thickness of the metal film 30, and the refractive index of liquid in the flow path. Meanwhile, optimum incidence conditions slightly vary depending on, for example, the type and amount of a fluorescent substance in the flow path and an error in the shape of the prism 20. Therefore, it is preferable to obtain an optimum enhancement angle for each measurement. In the present embodiment, a suitable output angle of the excitation light α with respect to the normal line (straight line in the z-axis direction in FIG. 1) of the metal film 30 is approximately 70°.

The light source control part 113 controls various devices included in the light source unit 111 to control the output of light (excitation light α) emitted from the light source unit 111. The light source control part 113 includes, for example, a known computer or microcomputer including an arithmetic device, a control device, a storage device, an input device, and an output device.

The excitation light detection unit 120 detects the reflected light β due to irradiation of the analysis chip 10 with the excitation light α, for positioning the analysis chip 10 and detecting an abnormality in the excitation light irradiation unit 110 in performing optical measurement (for example, detection of an enhancement angle, measurement of an optical blank value, and detection of the fluorescence γ).

Preferably, the excitation light detection unit 120 detects the reflected light β for positioning the analysis chip 10 and detecting an abnormality in the excitation light irradiation unit 110 before performing first optical measurement. In many cases, detection of an enhancement angle is performed as the first optical measurement. Therefore, it is preferable to detect the reflected light β before detection of the enhancement angle. In the case where detection of an enhancement angle is not performed, the reflected light β is detected before measurement of an optical blank value. In the case where neither detection of an enhancement angle nor measurement of an optical blank value is performed, the reflected light β is detected before detection of the fluorescence γ.

Detection of the reflected light β for detecting an abnormality in the excitation light irradiation unit 110 may be performed simultaneously with or separately from detection of the reflected light β for positioning the analysis chip 10. In the present embodiment, detection of the reflected light β for detecting an abnormality in the excitation light irradiation unit 110 is performed simultaneously with detection of the reflected light β for positioning the analysis chip 10.

The excitation light detection unit 120 includes a first light receiving sensor 121 and a first sensor control part 122.

The first light receiving sensor 121 detects the reflected light β of the excitation light α. The type of the first light receiving sensor 121 is not particularly limited as long as the reflected light β of the excitation light α can be detected. For example, the first light receiving sensor 121 is a photodiode (PD) or a position sensing device (PSD). The size of the light receiving surface of the first light receiving sensor 121 is preferably larger than the beam diameter of the excitation light α. For example, in the case where the beam diameter of the excitation light α is approximately 1 to 1.5 mm, the length of a side of the light receiving surface of the first light receiving sensor 121 is preferably 3 mm or more.

The first light receiving sensor 121 is disposed at a position where the reflected light β of the excitation light α is incident. In the present embodiment, the first light receiving sensor 121 is disposed at a position where the reflected light β from the incident surface 21 is incident. Preferably, the first light receiving sensor 121 is disposed at a position where the reflected light β of the excitation light α is incident which is emitted at the same angle as when the fluorescence γ is detected or at an angle close thereto. The irradiation position (irradiation direction) of the excitation light α slightly changes due to a change in the incident angle. Therefore, it becomes possible to further increase positioning accuracy at the time of detecting the fluorescence γ by setting the incident angle of the excitation light α to be used at the time of positioning the analysis chip 10 to the same angle as when detecting the fluorescence γ, or to an angle close thereto. In the present embodiment, when the output angle of the excitation light α with respect to the normal line (straight line in the z-axis direction in FIG. 1) of the metal film 30 is approximately 70°, the reflected light β from the incident surface 21 proceeds almost horizontally in the direction of movement of a conveyance stage (x-axis direction in FIG. 1). Therefore, the first light receiving sensor 121 is disposed at a position where the reflected light β traveling in the horizontal direction is incident (see FIG. 4C).

The first sensor control part 122 controls, for example, detection of an output value from the first light receiving sensor 121, management of the sensitivity of the first light receiving sensor 121 based on the detected output value, and a change of the sensitivity of the first light receiving sensor 121 for acquiring an appropriate output value. The first sensor control part 122 includes, for example, a known computer or microcomputer including an arithmetic device, a control device, a storage device, an input device, and an output device.

The fluorescence detection unit 130 detects the fluorescence γ due to irradiation of the metal film 30 with the excitation light α. Furthermore, as necessary, the fluorescence detection unit 130 also detects the plasmon scattering light δ due to irradiation of the metal film 30 with the excitation light α. The fluorescence detection unit 130 includes, for example, a light receiving unit 131, a position switching mechanism 132, and a second sensor control part 133.

The light receiving unit 131 is disposed in the normal direction of the metal film 30 of the analysis chip 10 (z-axis direction in FIG. 1). The light receiving unit 131 includes a first lens 134, an optical filter 135, a second lens 136, and the second light receiving sensor 137.

The first lens 134 is, for example, a condensing lens, and condenses light emitted from the metal film 30. The second lens 136 is, for example, an imaging lens, and causes the light condensed by the first lens 134 to form an image on the light receiving surface of the second light receiving sensor 137. An optical path between both lenses is a substantially parallel optical path.

The optical filter 135 is disposed between the first lens 134 and the second lens 136. At the time of fluorescence detection, the optical filter 135 transmits only the fluorescence component of light incident on the optical filter 135 to remove an excitation light component (plasmon scattering light δ). As a result, it is possible to guide only the fluorescence component to the second light receiving sensor 137 to detect the fluorescence γ with a high S/N ratio. Examples of the types of the optical filter 135 include an excitation light reflection filter, a short wavelength cut filter, and a band-pass filter. Examples of the optical filter 135 include a filter including a multilayer film that reflects a predetermined light component, and a color glass filter that absorbs a predetermined light component.

The second light receiving sensor 137 detects the fluorescence γ and the plasmon scattering light δ emitted from the analysis chip 10. Examples of the second light receiving sensor 137 include a photodiode (PD), a photomultiplier tube (PMT), and an avalanche photodiode (APD).

The position switching mechanism 132 switches the position of the optical filter 135 to a position on or off the optical path in the light receiving unit 131. Specifically, when the second light receiving sensor 137 detects the fluorescence γ, the optical filter 135 is disposed on the optical path of the light receiving unit 131, and when the second light receiving sensor 137 detects the plasmon scattering light δ, the optical filter 135 is disposed outside the optical path of the light receiving unit 131. The position switching mechanism 132 includes, for example, a rotation drive unit and a known mechanism (such as a turntable or a rack and pinion) that moves the optical filter 135 in the horizontal direction by using a rotary motion.

The second sensor control part 133 controls, for example, detection of an output value from the second light receiving sensor 137, management of the sensitivity of the second light receiving sensor 137 based on the detected output value, and a change of the sensitivity of the second light receiving sensor 137 for acquiring an appropriate output value. The second sensor control part 133 includes, for example, a known computer or microcomputer including an arithmetic device, a control device, a storage device, an input device, and an output device.

The liquid feeding unit 140 supplies a sample solution, a labeling solution, a cleaning liquid, and the like into the flow path 41 of the analysis chip 10 attached to the chip holder 154. The liquid feeding unit 140 includes a syringe pump 141, a pipette nozzle 146, a pipette tip 145, and a liquid feeding pump drive mechanism 143.

The liquid feeding unit 140 is used with the pipette tip 145 attached to the tip of the pipette nozzle 146. If the pipette tip 145 can be replaced, it is not necessary to wash the pipette tip 145, and contamination with impurities can be prevented.

The syringe pump 141 includes a syringe 142 and a plunger 144 that can reciprocate in the syringe 142. As a result of the reciprocating motion of the plunger 144, liquid is sucked and discharged quantitatively.

The liquid feeding pump drive mechanism 143 includes a drive device for the syringe pump 141 and a moving device for the pipette nozzle 146 to which the pipette tip 145 has been attached. The drive device for the syringe pump 141 is a device for reciprocating the plunger 144, and includes, for example, a stepping motor. The drive device including the stepping motor enables management of the liquid feeding amount and liquid feeding speed of the syringe pump 141. Thus, the drive device including the stepping motor is preferable from the viewpoint of managing the amount of residual liquid in the analysis chip 10. For example, the moving device for the pipette nozzle 146 freely moves the pipette nozzle 146 in two directions, that is, the axial direction of the pipette nozzle 146 (for example, a vertical direction) and a direction crossing the axial direction (for example, a horizontal direction). The moving device for the pipette nozzle 146 includes, for example, a robot arm, a two-axis stage, or a turntable that can move up and down.

The liquid feeding unit 140 preferably further includes a device for detecting the position of the tip of the syringe 142, from the viewpoint of making adjustment so as to keep the height of the syringe 142 relative to the analysis chip 10 constant and managing the amount of residual liquid in the analysis chip 10 such that the amount of residual liquid is kept constant.

The liquid feeding unit 140 sucks various liquids from a chemical liquid chip 147, and supplies the liquids into the flow path 41 of the analysis chip 10. At this time, the plunger 144 is moved to cause liquid to reciprocate in the flow path 41 in the analysis chip 10, so that the liquid in the flow path 41 is stirred. As a result, it is possible to achieve, for example, a uniform concentration of the liquid and promotion of a reaction (for example, an antigen-antibody reaction) in the flow path 41. From the viewpoint of performing such an operation, the analysis chip 10 and the pipette tip 145 are preferably designed such that the inlet of the analysis chip 10 is protected by a multilayer film, and that the inlet can be sealed when the pipette tip 145 penetrates the multilayer film.

The liquid in the flow path 41 is again sucked by the syringe pump 141 and discharged to the chemical liquid chip 147 or the like. Repetition of these operations enables reaction, washing, and the like to be performed with various liquids, so that a substance to be detected labeled with a fluorescent substance can be disposed on the reaction field in the flow path 41.

The conveyance unit 150 conveys the analysis chip 10 to an installation position, a measurement position, or a liquid feeding position, and fixes the analysis chip 10 thereto. Here, the "installation position" refers to a position where the analysis chip 10 is installed in the SPFS device 100 (more specifically, the chip holder 154). Here, the "measurement position" refers to a position where the fluorescence detection unit 130 detects the fluorescence γ that is generated when the excitation light irradiation unit 110 irradiates the analysis chip 10 with the excitation light α. Furthermore, the "liquid feeding position" refers to a position where the liquid feeding unit 140 supplies a liquid into the flow path 41 of the analysis chip 10 or removes a liquid in the flow path 41 of the analysis chip 10.

The conveyance unit 150 includes a conveyance stage 152 and the chip holder 154.

The conveyance stage 152 moves the chip holder 154 in one direction (x-axis direction in FIG. 1) and in a direction opposite thereto. The conveyance stage 152 is driven by, for example, a stepping motor.

The chip holder 154 is fixed to the conveyance stage 152, and holds the analysis chip 10 in a detachable manner. The chip holder 154 has a shape that enables the analysis chip 10 to be held without obstructing the optical path of light such as the excitation light α, the reflected light β, and the fluorescence γ. For example, the chip holder 154 is provided with an opening through which these types of light pass.

A temperature control unit 70 blows warm air onto the analysis chip 10, and controls the temperature of the analysis chip 10 and the ambient temperature of the analysis chip 10, so as to perform temperature control such that the temperature in the flow path 41 of the analysis chip 10 is kept constant. It is possible to control the amount of heat released from the analysis chip 10 and to more stably control the temperature in the flow path 41 of the analysis chip 10, by controlling the ambient temperature of the analysis chip 10 as well as the temperature of the analysis chip 10. In addition, the temperature control unit 70 may also blow warm air onto the pipette tip 145 to adjust the temperature of the pipette tip 145 and the ambient temperature of the pipette tip 145. As a result, when causing a liquid to reciprocate in the flow path 41 in the analysis chip 10 by using the liquid feeding unit 140 described above, it is possible to perform temperature control so that the temperature of the liquid having returned from the flow path 41 into the pipette tip 145 does not change (decrease) in the pipette tip 145, and thus possible to more stably control the temperature in the flow path 41 of the analysis chip 10. Furthermore, as will be described later, the temperature control unit 70 can also dry the condensation or mist formed on the incident surface 21 to resolve an abnormal state of the incident surface 21 by blowing warm air onto the incident surface 21 of the analysis chip 10.

The temperature control unit 70 includes a temperature control means 71, a temperature sensor 72, and a blower means 73. The temperature control means 71 is disposed away from the analysis chip 10. The temperature sensor 72 is disposed between the temperature control means 71 and the analysis chip 10. The blower means 73 sends, to the analysis chip 10, air heated or cooled by the temperature control means 71. In the present embodiment, the temperature control unit 70 is provided such that the temperature of the analysis chip 10 can be controlled in a state where the analysis chip 10 is in the liquid feeding position. Note that the orientation of the temperature control unit 70 can also be changed such that the temperature of the analysis chip 10 can be controlled even if the position of the analysis chip 10 changes. Furthermore, a direction in which warm air flows may be controlled by a duct, a fin, or the like such that the warm air is blown onto the incident surface 21.

The temperature control means 71 is controlled by the control processing part 160 to be described later, so as to achieve a predetermined temperature. Note that the temperature control means 71 may be a heating element or a cooling element. The temperature control means 71 as described above is not particularly limited. For example, an electric resistance element, an infrared heater, or a Peltier element can be used as the temperature control means 71. Examples of the infrared heater include a cartridge heater, a rubber heater, and a ceramic heater.

The air heated or cooled by the temperature control means 71 is blown, by the blower means 73, onto the analysis chip 10. As a result, the analysis chip 10 is heated or cooled in a non-contact manner. The blower means 73 is not particularly limited. For example, a known blower such as an axial blower or a centrifugal blower can be used as the blower means 73. Note that the blower means 73 is preferably configured such that a pressure ratio can be changed by the control processing part 160 to be described later.

The temperature sensor 72 is not particularly limited as long as the temperature sensor 72 can transmit a signal (output value) corresponding to a measured temperature to the control processing part 160 to be described later. For example, a thermistor or a thermocouple can be used as the temperature sensor 72. Note that the temperature sensor 72 measures the temperature of air to be blown onto the analysis chip 10.

The control processing part 160 controls the angle adjustment mechanism 112, the light source control part 113, the first sensor control part 122, the position switching mechanism 132, the second sensor control part 133, the liquid feeding pump drive mechanism 143, and the conveyance stage 152. Furthermore, the control processing part 160 determines the position of the analysis chip 10 held by the chip holder 154 based on a result of detection by the excitation light detection unit 120, and also moves the chip holder 154 by means of the conveyance stage 152 to move the analysis chip 10 to an appropriate measurement position. Thus, the control processing part 160 also functions as a position adjustment part. Moreover, the control processing part 160 also has a function as an abnormality determination part that determines whether the analysis chip 10 is normal in the step of moving the analysis chip 10 to the appropriate measurement position. The control processing part 160 includes, for example, a known computer or microcomputer including an arithmetic device, a control device, a storage device, an input device, and an output device.

Note that the control processing part 160 includes a storage part (not illustrated), a timer (not illustrated), a printing part (not illustrated), and the like. The storage part stores results of detection of the reflected light $\beta$. The printing part prints measurement results. In addition, the control processing part 160 is connected to a display screen (not illustrated) for displaying a warning and the like to be described later, and a speaker (not illustrated) for sounding a warning and the like.

(Operation of SPFS Device)

Figure 2:
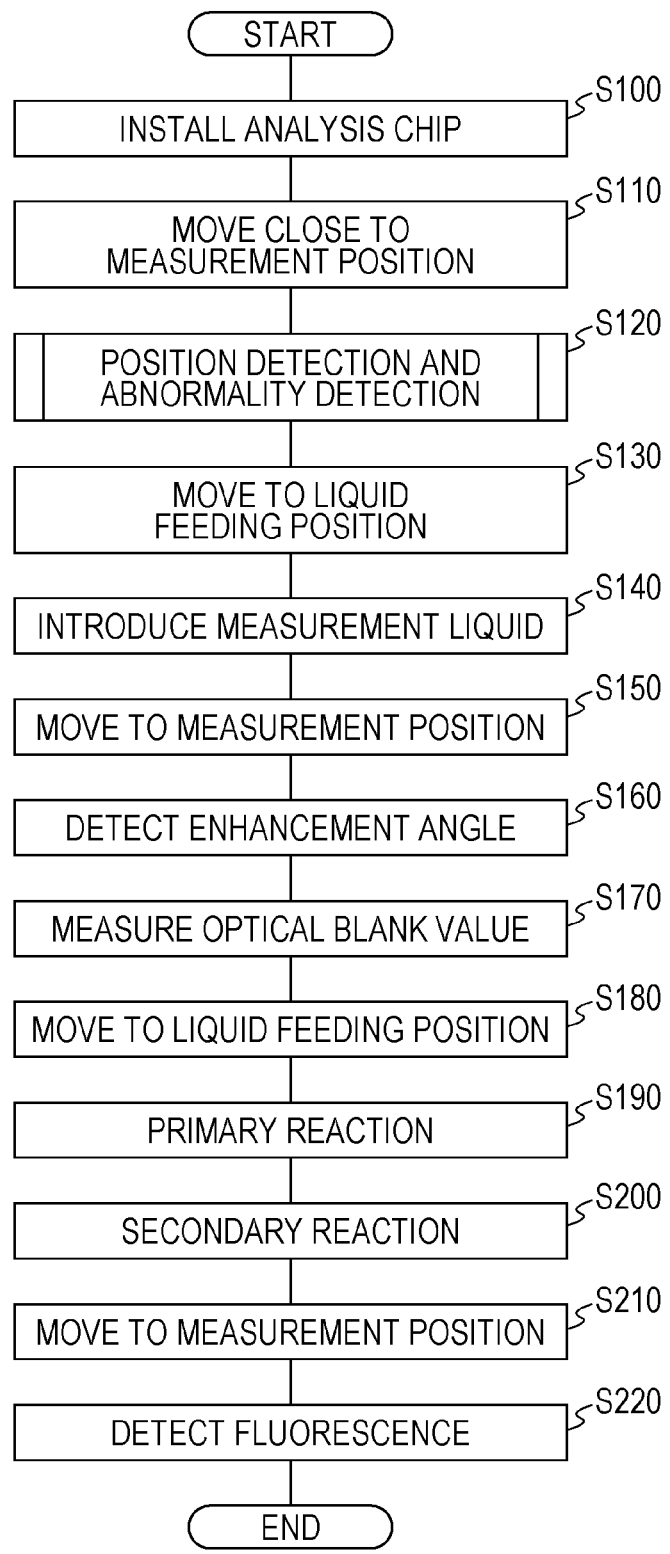
FIG. 2 is a flowchart illustrating an operation procedure of the SPFS device according to the embodiment.

Next, the operation of the SPFS device 100 (analysis method according to the present embodiment) will be described. FIG. 2 is a flowchart illustrating an example of a first operation procedure of the SPFS device 100.

First, a user installs the analysis chip 10 in the installation position of the SPFS device 100 (step S100). Specifically, the user installs the analysis chip 10 in the chip holder 154 of the SPFS device 100.

Next, the control processing part 160 operates the conveyance stage 152 to move the analysis chip 10 close to the measurement position (step S110).

Next, the control processing part 160 operates the excitation light irradiation unit 110, the excitation light detection unit 120, and the conveyance stage 152 to acquire a value of the quantity of the reflected light $\beta$ from the surface of the analysis chip 10, incident on the first light receiving sensor 121. Then, the control processing part 160 acquires the position information of the analysis chip 10 based on the position information (relative position information) of the conveyance stage 152 and the acquired quantity of the reflected light $\beta$, and also adjusts the position of the analysis chip 10 (conveyance stage 152) based on the acquired position information. Furthermore, in this process, an abnormality in the analysis chip 10 is detected (step S120). The flow in step S120 will be described later with reference to FIG. 3.

Figure 4A:
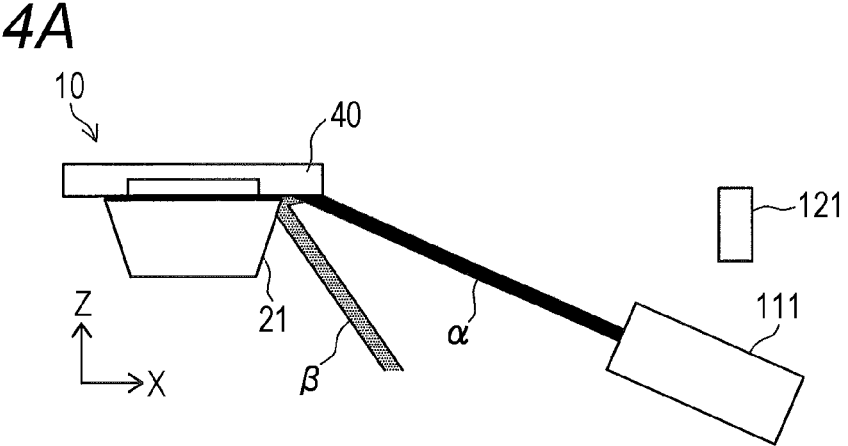
FIGS. 4A-4C are schematic diagrams for describing the relationship between the position information of an analysis chip and the quantity of reflected light incident on a first light receiving sensor in the position detection/abnormality detection step (step S120).
Figure 4B:
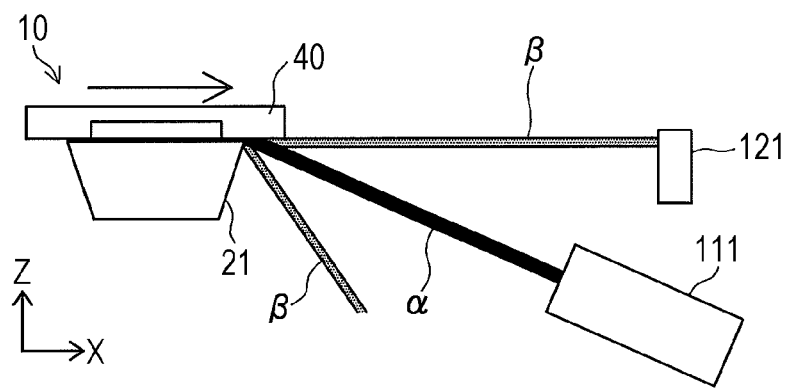
Figure 4C:
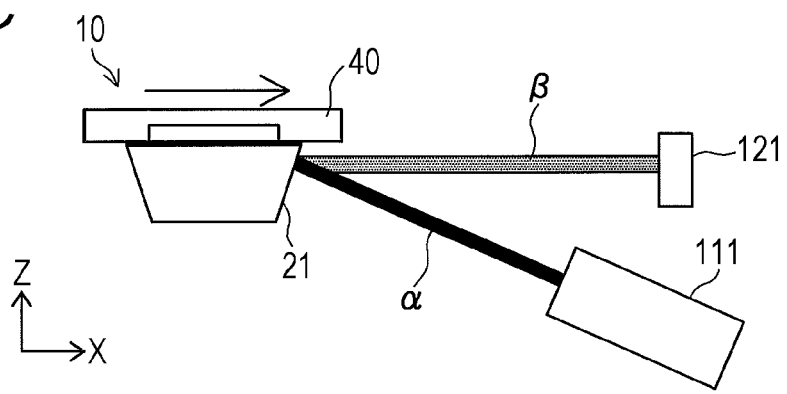

FIGS. 4A to 4C are schematic diagrams for describing the relationship between the position information of the analysis chip 10 and the quantity of the reflected light $\beta$ incident on the first light receiving sensor 121 in step S120. First, as illustrated in FIG. 4A, when the light source unit 111 emits the excitation light $\alpha$ in the case where the analysis chip 10 is located away from the light source unit 111, the excitation light $\alpha$ is reflected by the flow path lid 40, and travels downward (conveyance stage 152 side). Therefore, the reflected light $\beta$ from the surface of the analysis chip 10 does not enter the first light receiving sensor 121 of the excitation light detection unit 120.

When the analysis chip 10 is brought closer to the light source unit 111 in this state, the excitation light $\alpha$ from the light source unit 111 reaches a boundary portion (hereinafter referred to as "edge portion") between the prism 20 and the flow path lid 40. In this case, as illustrated in FIG. 4B, the excitation light $\alpha$ (reflected light $\beta$) reflected by the flow path lid 40 does not enter the first light receiving sensor 121. Meanwhile, the excitation light $\alpha$ (reflected light $\beta$) reflected by the incident surface 21 enters the first light receiving sensor 121. Therefore, a part of the reflected light $\beta$ from the analysis chip 10 enters the first light receiving sensor 121.

When the analysis chip 10 is brought much closer to the light source unit 111, all of the excitation light $\alpha$ from the light source unit 111 reaches the incident surface 21 of the prism 20. Therefore, as illustrated in FIG. 4C, all of the reflected light $\beta$ from the surface of the analysis chip 10 enters the first light receiving sensor 121.

Figure 5A:
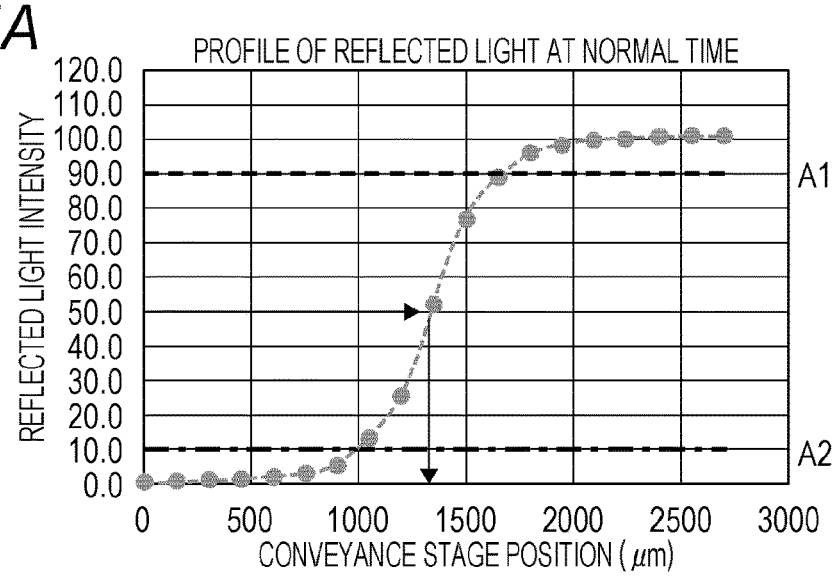
FIGS. 5A-5C are graphs illustrating examples of the result of detection of reflected light by the first light receiving sensor.

FIG. 5A is a graph illustrating an example of a result of detection (hereinafter referred to as a profile) of the reflected light $\beta$ by the first light receiving sensor 121. Here, an example will be described in which the quantity of the reflected light $\beta$ is measured by the first light receiving sensor 121 while the analysis chip 10 is moved in a stepwise manner at intervals of 150 µm in one direction (x-axis direction) by means of the conveyance stage 152. The beam diameter of the excitation light $\alpha$ is approximately 1 to 1.5 mm. Note that FIG. 5A illustrates a detection result in the case where the analysis chip 10 is normal.

Here, as illustrated in FIG. 5A, the reflected light $\beta$ from the surface of the analysis chip 10 does not enter the first light receiving sensor 121 when the moving distance of the conveyance stage 152 is between 0 and approximately 900 µm. This is because the excitation light $\alpha$ is reflected by the flow path lid 40, and travels downward (conveyance stage 152 side) (see FIG. 4A). Meanwhile, the intensity of the reflected light $\beta$ incident on the first light receiving sensor 121 gradually increases while the moving distance of the conveyance stage 152 is between approximately 900 and approximately 1,800 µm. This is because a part of the excitation light $\alpha$ is applied to the incident surface 21, so that the reflected light $\beta$ from the incident surface 21 enters the first light receiving sensor 121 (see FIG. 4B). When the moving distance of the conveyance stage 152 exceeds approximately 1,800 µm, the intensity of the reflected light $\beta$ incident on the first light receiving sensor 121 is substantially constant and maximized. This is because all of the excitation light $\alpha$ is applied to the incident surface 21, so that the reflected light $\beta$ from the incident surface 21 enters the first light receiving sensor 121 (see FIG. 4C). Therefore, the inclined portion (moving distance: approximately 900 to approximately 1,800 µm) in the graph corresponds to the edge portion. Note that the width of the inclined portion corresponds to the beam diameter (approximately 1 to 1.5 mm) of the excitation light $\alpha$ in the x-axis direction.

Figure 3:
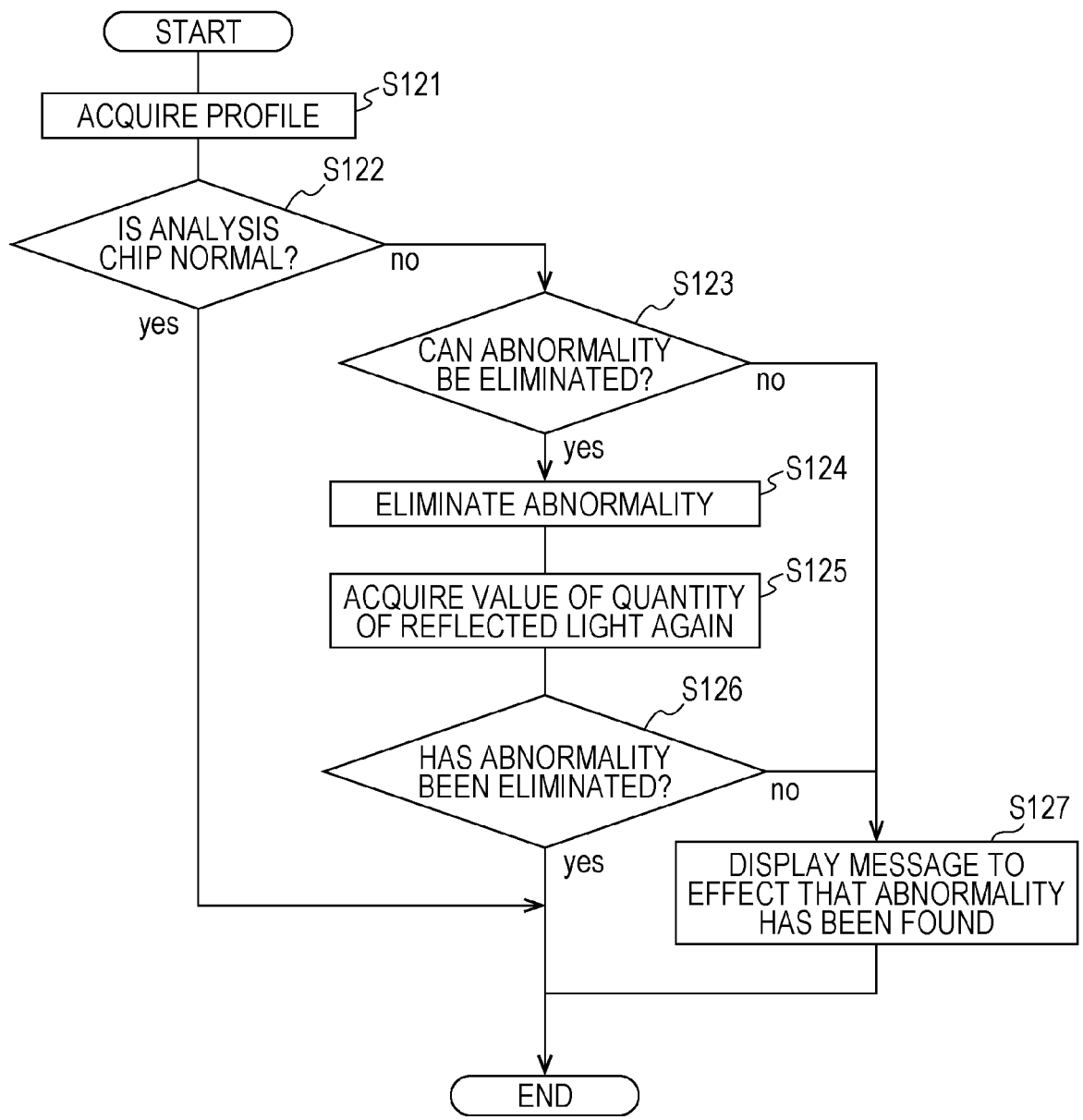
FIG. 3 is a flowchart illustrating steps in a position detection/abnormality detection step (step 5120) illustrated in FIG. 2.

FIG. 3 is a flowchart illustrating steps in the step of detecting the position of the analysis chip 10 and detecting an abnormality in the analysis chip 10 (step S120) illustrated in FIG. 2. As described above, in step S120, the analysis chip 10 held by the chip holder 154 is irradiated with the excitation light $\alpha$ while the position of the conveyance stage 152 is changed. In addition, there is acquired a value of the quantity of the reflected light β from the surface of the analysis chip 10, incident on the first light receiving sensor 121, so that a profile as illustrated in FIG. 5A is acquired (step S121). The profile represented by the position information of the conveyance stage 152 and the value of the quantity of the reflected light β is stored in the storage part. Analysis is performed as described above, based on the position information of the conveyance stage 152 and the quantity of the reflected light β (profile) acquired as above. As a result, the accurate position information of the analysis chip 10 is acquired (position information acquisition step). Furthermore, abnormality determination on the analysis chip 10 is performed as follows, by use of the profile information and the position information of the analysis chip 10 acquired as above (abnormality determination step).

<Position Information Acquisition Step>

First, the position information acquisition step of the analysis chip 10 will be described.

Accurate position information of the analysis chip 10 is acquired, based on the position information of the conveyance stage 152 and the detection result of the reflected light β (profile) acquired as above. Specifically, the control processing part 160 sets upper and lower 10% absolute values of the reflected light β. That is, an upper limit A1 and a lower limit A2 of the intensity of the quantity of the reflected light β are set on the assumption that the intensity of the maximum quantity of the reflected light β achieved in the case where the total beam diameter of the excitation light α is incident on the incident surface 21 is taken as a base of 100. As illustrated in FIG. 5, an intensity of 90 is set as the upper limit A1, and an intensity of 10 is set as the lower limit A2. Next, the control processing part 160 reads the profile from the storage part, and directly approximates the plot (five points in this case) between the upper limit A1 and the lower limit A2 in the profile, to detect the position of the analysis chip 10 (1,400 μm in this case) that achieves the quantity of the reflected light β having an intensity of 50. Note that the position that achieves the reflected light β having an intensity of 50 corresponds to a position that causes half of the total beam diameter of the excitation light α to be incident on the incident surface 21, that is, a position that causes the beam diameter of the applied excitation light α to be centered on an edge between the incident surface 21 and the flow path lid 40. As a result, it is possible to accurately acquire the position information of the analysis chip 10 installed in the chip holder 154, cancel a positional shift caused at the time of installation of the analysis chip 10, and accurately convey the analysis chip 10 to the measurement position.

<Abnormality Determination Step>

Next, the range of the position of the analysis chip 10 (the range of the position of the conveyance stage 152) that causes the total beam diameter of the excitation light α to be incident on the incident surface 21 is calculated from the accurate position information of the analysis chip 10 (the position of the conveyance stage 152 that causes the beam diameter of the applied excitation light α to be centered on the edge) calculated in the position information acquisition step. That is, assume that the conveyance stage 152 is moved to the plus side more than half of the beam diameter from the position of the conveyance stage 152 that causes the beam diameter of the applied excitation light α to be centered on the edge, which is calculated in the position information acquisition step. Then, the conveyance stage 152 arrives at a position that causes the total beam diameter of the excitation light α to be incident on the incident surface 21. For example, in the case where the edge position is 1,400 μm and the beam diameter of the excitation light α is 1 mm, the above-described position corresponds to a value of a position in the range of 1,900 μm or more (in this case, seven points in the range of 1,950 μm or more).

Next, the control processing part 160 determines whether the analysis chip 10 is normal within the range of the position of the analysis chip 10 (step S122). For example, the control processing part 160 performs the determination by determining whether, in the profile read from the storage part, a value equal to or lower than the upper limit A1 is included in values of the quantity of the reflected light β (hereinafter, referred to as the quantity of target reflected light) generated in the case where the total beam diameter of the excitation light α is incident on the incident surface 21. Specifically, if all the values of the quantity of the target reflected light (values corresponding to the positions of the conveyance stage 152 in the range of 1,950 μm or more) exceed the upper limit A1 as illustrated in FIG. 5A, the control processing part 160 determines that the analysis chip 10 is normal. Meanwhile, if a light quantity equal to or lower than the upper limit A1 is included in the values of the quantity of the target reflected light as illustrated in FIGS. 5B and 5C, the control processing part 160 determines that the analysis chip 10 is abnormal.

Here, the upper limit A1 is 90% of the maximum quantity of the reflected light β (variation 10%). This is because the variation in the quantity of the reflected light β is assumed to be 10% or less even in consideration of a possible variation in any of the quantity of the reflected light β, an individual difference in the refractive index of the analysis chip 10, and an individual difference in the sensitivity of the first light receiving sensor 121. Therefore, when the amount of change is larger than the assumed value, it is to be determined that there is an abnormality. It is desirable to set the upper limit A1 to an arbitrary value according to an assumed variation. In this case, it is conceivable that any value in the range of not less than 85% and not more than 95% of the maximum quantity of the reflected light β is set as the upper limit A1.

When the analysis chip 10 is normal (step S122: yes), the process proceeds to step S130, and the control processing part 160 continues measurement as before. Meanwhile, when there is an abnormality in the analysis chip 10 (step S122: no), the control processing part 160 determines whether the abnormality in the analysis chip 10 can be eliminated (step S123).

Figure 5B:
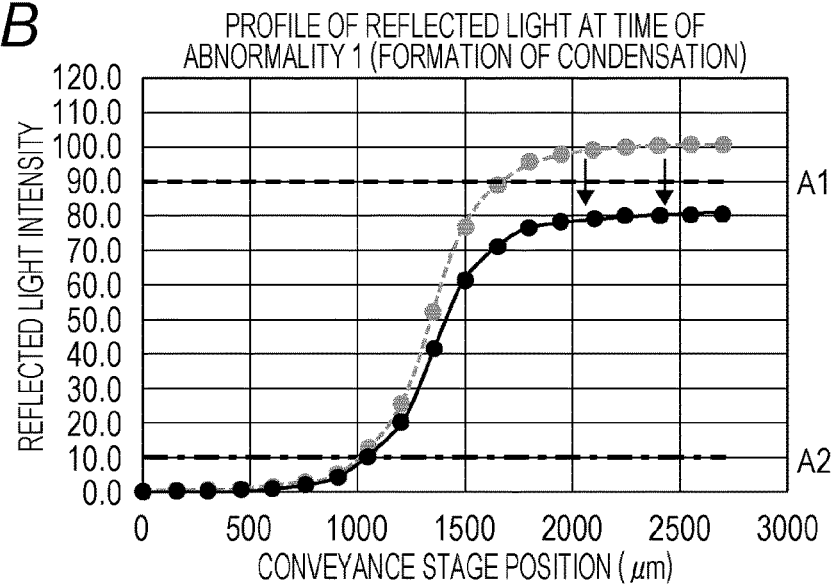
Figure 5C:
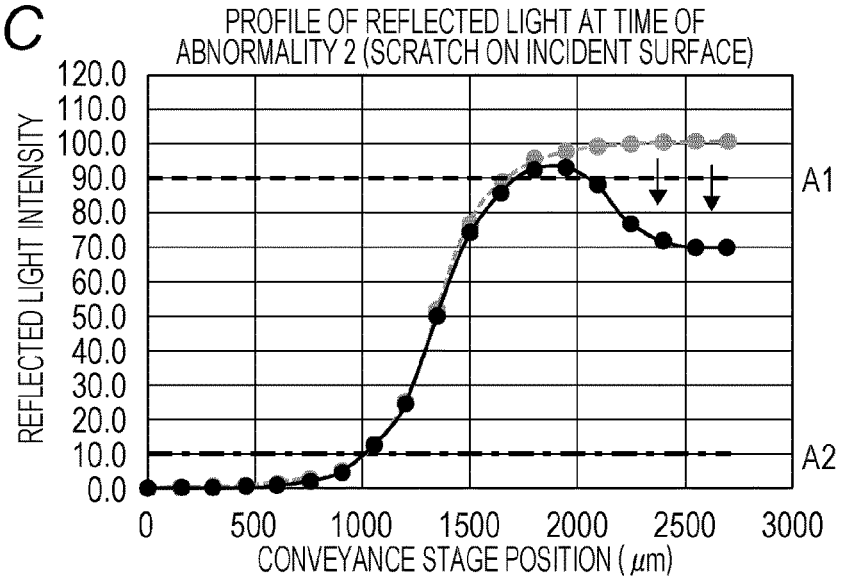

For example, as illustrated in FIG. 5B, when the quantity of the target reflected light represented in the profile is substantially flat and the quantity of the reflected light β is uniformly reduced, the control processing part 160 determined that the abnormality in the analysis chip 10 can be eliminated. In this case, it can be estimated that there is a high possibility that condensation or mist has occurred on the entire incident surface 21. When condensation or a mist is formed on the incident surface 21, the reflected light β is scattered by water droplets. This reduces the quantity of the reflected light β to be detected by the first light receiving sensor 121.

Note that whether the quantity of the target reflected light has a substantially flat shape is determined based on whether a difference between the maximum value and the minimum value of the quantity of the target reflected light is equal to or lower than a predetermined rate of the maximum value in the profile. That is, if the difference between the maximum value and the minimum value of the quantity of the target reflected light is equal to or lower than the predetermined rate of the maximum value, it is determined that the quantity of the target reflected light has a substantially flat shape. If the difference between the maximum value and the minimum value of the quantity of the target reflected light exceeds the predetermined rate of the maximum value, it is determined that the quantity of the target reflected light is not flat. Here, the predetermined rate of the maximum value is most preferably 10% of the maximum value. However, it is also conceivable that the predetermined rate of the maximum value is set to a value in the range of, for example, not less than 5% and not more than 20% of the maximum value.

When the abnormality in the analysis chip 10 can be eliminated (step S123: yes), the control processing part 160 performs a process of eliminating the abnormality in the analysis chip 10 (step S124). For example, the temperature control unit 70 blows warm air onto the incident surface 21 of the analysis chip 10 to dry the condensation or mist formed on the incident surface 21. In addition, the control processing part 160 may interrupt measurement at the time when it is determined that the abnormality in the analysis chip 10 can be eliminated, and may proceed to step S125 after leaving the analysis chip 10 on the conveyance stage 152 having a controlled temperature for a predetermined period of time or more. Note that the predetermined period of time is measured from the interruption of measurement with a timer. In this case, it is possible to proceed to step S125 after waiting for the condensation or mist formed on the incident surface 21 to disappear while the measurement is interrupted. As a result, the specimen and the analysis chip 10 can be quickly returned to normal use in measurement without being wasted.

When the abnormality in the analysis chip 10 is eliminated, the control processing part 160 causes the light source unit 111 to emit the excitation light α again, and causes the first light receiving sensor 121 to receive the reflected light β reflected by the incident surface 21 of the prism 20, to acquire a value of the quantity of the reflected light β (step S125). Here, the light source unit 111 is caused to emit the excitation light α in at least one of the positions where the total beam diameter of the excitation light α is incident on the incident surface 21 (in this case, positions in the range of 1,950 μm or more), for example, the last measurement point (the position at 2,700 μm illustrated in FIGS. 5A to 5C). Note that instead of acquiring the quantity of the reflected light β only at the last measurement point, it is also possible to reacquire the profile while moving the analysis chip 10 by means of the conveyance stage 152 again.

Next, the control processing part 160 determines whether the abnormality in the analysis chip 10 has been eliminated (step S126). For example, if the value of the quantity of the reflected light β acquired again exceeds the upper limit A1, it is determined that the abnormality in the analysis chip 10 has been eliminated. If the value of the quantity of the reflected light β acquired again is equal to or lower than the upper limit A1, it is determined that the abnormality in the analysis chip 10 has not been eliminated. Note that in the case where the profile is acquired, if all the values of the quantity of the reflected light β exceed the upper limit A1, it is determined that the abnormality in the analysis chip 10 has been eliminated, and if the values of the quantity of the reflected light β include a value equal to or lower than the upper limit A1, it is determined that the abnormality in the analysis chip 10 has not been eliminated.

When the abnormality in the analysis chip 10 has been eliminated (step S126: yes), measurement is continued and the process proceeds to step S130. Meanwhile, when the abnormality in the analysis chip 10 has not been eliminated (step S126: no), the control processing part 160 displays a message such as "abnormality has been found in the analysis chip" on the display screen (step S127). Then, the process proceeds to step S130.

Note that there are also cases where the abnormality in the analysis chip 10 cannot be eliminated in step S123 (step S123: no). For example, when the quantity of the target reflected light represented in the profile is not flat, as illustrated in FIG. 5C, the control processing part 160 displays a message such as "abnormality has been found in the analysis chip" on the display screen (step S127).

Note that when the quantity of the target reflected light represented in the profile is not flat, as illustrated in FIG. 5C, the quantity of the reflected light β varies depending on points on the incident surface 21. It can be estimated that it is highly possible that the abnormality in this case is not an abnormality such as condensation or a mist uniformly formed on the incident surface 21, but an abnormality caused by a scratch or dirt on a part of the incident surface 21.

When the step of detecting the position of the analysis chip 10 and detecting an abnormality in the analysis chip 10 (step S120, see FIG. 2) is completed, the control processing part 160 operates the conveyance stage 152 to move the analysis chip 10 to the liquid feeding position (step S130). In addition, the control processing part 160 operates the liquid feeding unit 140 to introduce a measurement liquid in the chemical liquid chip 147 into the flow path 41 of the analysis chip 10 (step S140). Note that in the case where a stored reagent is present in the flow path 41 of the analysis chip 10, the flow path 41 is washed to remove the stored reagent in introducing the measurement liquid so that the capturing body can appropriately capture a substance to be detected.

Next, the control processing part 160 operates the conveyance stage 152 to move the analysis chip 10 to a measurement position (step S150). At this time, it is possible to cancel a positional shift caused at the time of installation of the analysis chip 10 in the chip holder 154, and to accurately measure the analysis chip 10 at the measurement position, by reflecting the accurate position of the analysis chip 10 calculated in the position information acquisition step of step S120.

Next, the control processing part 160 operates the excitation light irradiation unit 110 and the fluorescence detection unit 130 to irradiate the analysis chip 10 disposed at the appropriate measurement position with the excitation light α and to detect the plasmon scattering light δ having the same wavelength as the excitation light α. Thus, an enhancement angle is detected (step S160). Specifically, while operating the excitation light irradiation unit 110 to scan the incident angle of the excitation light α with respect to the metal film 30, the control processing part 160 operates the fluorescence detection unit 130 to detect the plasmon scattering light δ. At this time, the control processing part 160 operates the position switching mechanism 132 to place the optical filter 135 outside the optical path of the light receiving unit 131. Then, the control processing part 160 determines, as an enhancement angle, an incident angle of the excitation light α that maximizes the quantity of the plasmon scattering light δ.

Next, the control processing part 160 operates the excitation light irradiation unit 110 and the fluorescence detection unit 130 to irradiate the analysis chip 10 disposed at the appropriate measurement position with the excitation light α and to record an output value (optical blank value) from the second light receiving sensor 137 (step S170). At this time, the control processing part 160 operates the angle adjustment mechanism 112 to set the incident angle of the excitation light α to the enhancement angle. In addition, the control processing part 160 controls the position switching mechanism 132 to place the optical filter 135 in the optical path of the light receiving unit 131.

Next, the control processing part 160 operates the conveyance stage 152 to move the analysis chip 10 to the liquid feeding position (step S180).

Next, the control processing part 160 operates the liquid feeding unit 140 to introduce a sample solution in the chemical liquid chip 147 into the flow path 41 of the analysis chip 10 (step S190). In the flow path 41, the substance to be detected is captured on the metal film 30 by an antigen-antibody reaction (primary reaction). Thereafter, the sample solution in the flow path 41 is removed, and the inside of the flow path 41 is cleaned with a cleaning liquid.

Next, the control processing part 160 operates the liquid feeding unit 140 to introduce a liquid (labeling solution) containing a secondary antibody labeled with a fluorescent substance into the flow path 41 of the analysis chip 10 (step S200). In the flow path 41, the substance to be detected that has been captured on the metal film 30 is labeled with the fluorescent substance by an antigen-antibody reaction (secondary reaction). Thereafter, the labeling solution in the flow path 41 is removed, and the inside of the flow path 41 is cleaned with the cleaning liquid.

Next, the control processing part 160 operates the conveyance stage 152 to move the analysis chip 10 to the appropriate measurement position determined in step S120 (step S210).

Next, the control processing part 160 operates the excitation light irradiation unit 110 and the fluorescence detection unit 130 to irradiate the analysis chip 10 disposed at the appropriate measurement position with the excitation light α and to detect the fluorescence γ emitted from the fluorescent substance labeling the substance to be detected that has been captured by the capturing body (step S220). Also in this case, the incident angle of the excitation light α is set to the enhancement angle, and detection is performed in a state where the optical filter 135 is placed in the optical path of the light receiving unit 131, as in step S140.

Finally, the control processing part 160 subtracts the optical blank value from the detection value of the fluorescence γ to calculate a fluorescence intensity that correlates with the amount of the substance to be detected. The calculated fluorescence intensity is converted into the amount, concentration, or the like of the substance to be detected, as necessary.

In accordance with the above procedure, it is possible to detect the presence or amount of the substance to be detected in the sample solution.

(Effects)

As described above, according to the analysis method and the SPFS device (analysis device) 100 according to the present embodiment, an abnormality in the analysis chip 10 can be determined when the position of the analysis chip 10 is detected. Accordingly, no additional device or detection step is required. It is thus possible to easily prevent an abnormal measurement result from being detected.

In addition, since no additional device or detection step is required, the manufacturing cost of the SPFS device 100 is not increased, and detection time is not increased.

Furthermore, it is possible to detect abnormalities that occur in various cases, such as abnormalities due to the usage environment of the analysis chip 10 (for example, condensation or a mist on the incident surface 21) and abnormalities caused by user's operational errors (for example, a scratch or dirt on the incident surface 21).

Moreover, it is possible to remedy a mistake in each step by detecting an abnormality (for example, a scratch or dirt on the incident surface 21) caused by a user's operational error during manufacturing, transportation, storage, or the like of the analysis chip 10 before the analysis chip 10 is delivered to the user's hand.

In addition, it is determined whether an abnormality in the analysis chip 10 can be restored. Therefore, if the abnormality can be restored, the analysis chip 10 can be quickly returned to normal use in measurement without being wasted. If the abnormality cannot be restored, a useless return operation can be avoided.

Note that in the above-described embodiment, a warning is displayed on the display screen in step S127. Instead, an audio warning may be provided by a speaker. In addition, the control processing part 160 may print and output a warning on measurement result data.

Furthermore, if it is determined that the abnormality in the analysis chip 10 has not been eliminated (step S126: no), measurement may be interrupted. In this case, it is possible to reduce waste of time and replace the analysis chip 10 with a normal one to start re-inspection, by ending measurement without performing the return operation.

Figure 6:
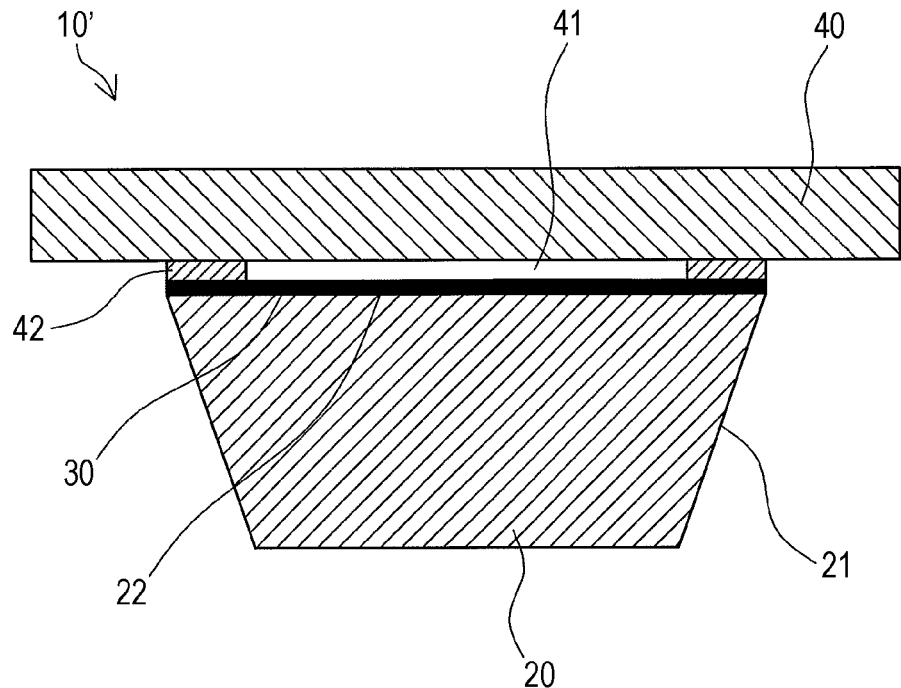
FIG. 6 is a cross-sectional view of another example of an analysis chip.

Moreover, in the above-described embodiment, the "two surfaces of the analysis chip 10, adjacent to each other" described with reference to FIG. 4 include two substantially adjacent surfaces. For example, assume that there is used an analysis chip 10' that includes the prism 20, the metal film 30, a spacer 42, and the flow path lid 40, as illustrated in FIG. 6. The metal film 30 is disposed on the film formation surface 22 of the prism. The spacer 42 is disposed on the metal film 30. The flow path lid 40 is disposed on the spacer 42. The shape of the flow path 41 is formed by the spacer 42. Meanwhile, the flow path lid 40 is a transparent flat plate. In this case, strictly speaking, the side surface of the spacer 42 exists between the incident surface 21 of the prism 20 and the lower surface of the flow path lid 40. Therefore, the incident surface 21 and the lower surface of the flow path lid 40 are not adjacent to each other. However, in the case where the spacer 42 is very thin (for example, 100 μm) compared to the beam diameter (for example, 1 to 1.5 mm) of the excitation light α, the incident surface 21 and the lower surface of the flow path lid 40 can be considered substantially adjacent to each other. Therefore, in this case, the edge portion is detected by detection of the reflected light β from the incident surface 21 and the lower surface of the flow path lid 40, which are substantially adjacent. A bonding member, such as an adhesive or a double-sided tape, the metal film 30, and the like can be similarly ignored.

A member (for example, the spacer 42) having a thickness of ⅕ or less, preferably 1/10 or less, of the beam diameter of the excitation light α can be thus ignored in detecting the reflected light β. For example, when the excitation light α is applied to a region including the spacer 42 having a thickness of ⅕ or less, or 1/10 or less of the beam diameter of the excitation light α, the reflected light β from the incident surface 21 or the lower surface of the flow path lid 40 accounts for most (⅘ or more, or 9/10 or more) of the reflected light β from the surface of the analysis chip 10', and can be used for position detection. Therefore, the position of the analysis chip 10' can be determined without being affected by the spacer 42. Thus, a member having a thickness of ⅕ or less of the beam diameter of the excitation light α (such as the spacer 42, a bonding member, or the metal film 30) can be ignored in detecting the reflected light β.

That is, the incident surface 21 and the lower surface of the flow path lid 40 of the analysis chip 10' can be considered as two surfaces that are substantially adjacent.

Figure 7A:
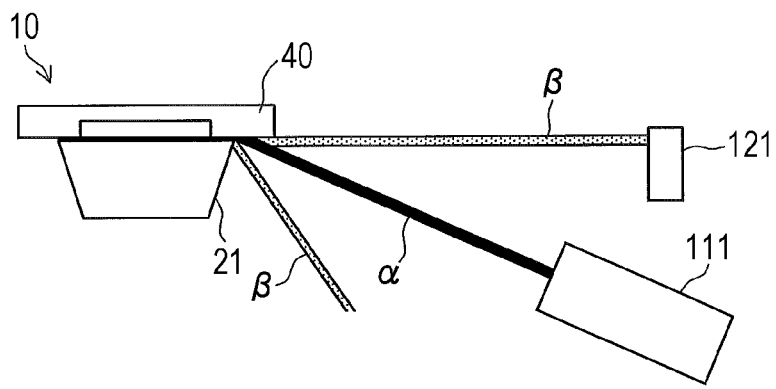
FIGS. 7A and 7B are schematic diagrams for describing a step of placing the analysis chip at a measurement position.
Figure 7B:
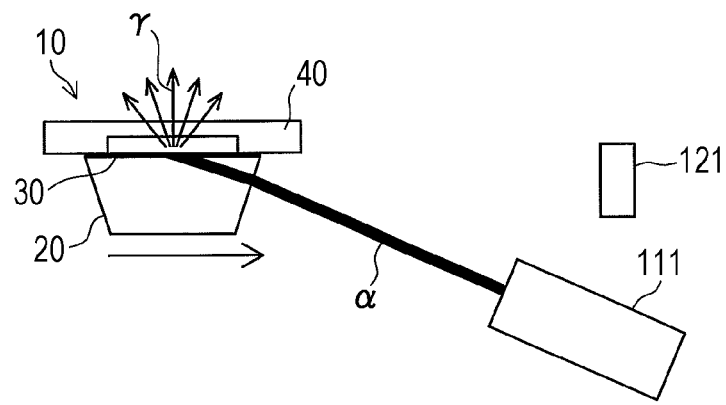

Furthermore, FIGS. 7A and 7B are schematic diagrams for describing a step of placing the analysis chip 10 at an appropriate measurement position. First, as illustrated in FIG. 7A, it is assumed that the position of the edge portion is determined. In this case, the distance between the position of the edge portion and a region to be irradiated with the excitation light α on the back surface of the metal film 30 (region on the back side of the reaction field) is determined. Therefore, as illustrated in FIG. 7B, it is possible to dispose the analysis chip 10 at an appropriate measurement position by causing the conveyance stage 152 to move the chip holder 154 a predetermined distance.

Figure 8A:
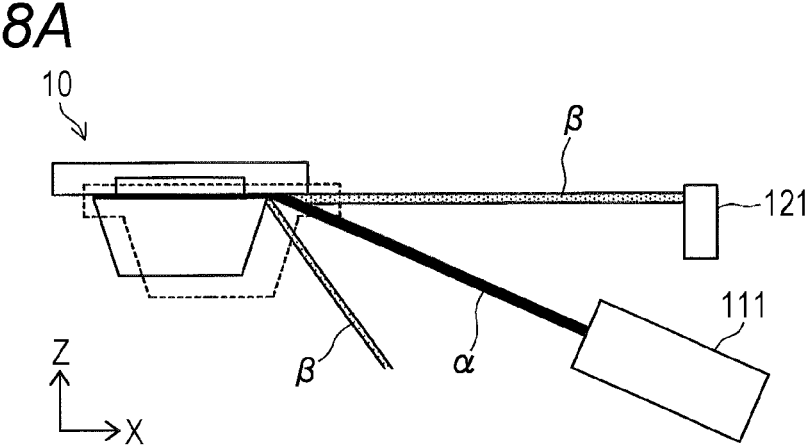
FIGS. 8A and 8B are schematic diagrams for describing a step of placing the analysis chip at the measurement position.
Figure 8B:
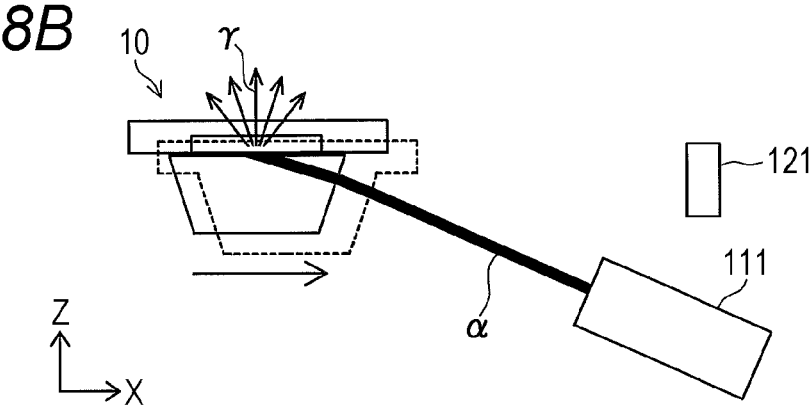

Furthermore, it is possible to dispose the analysis chip 10 at an appropriate measurement position also in the case where the analysis chip 10 is disposed such that the analysis chip 10 is shifted in the height direction (z-axis direction) (in the case where, for example, dust is sandwiched between the analysis chip 10 and the chip holder 154) as illustrated in FIGS. 8A and 8B. That is, it is assumed that the position of the edge portion is determined as illustrated in FIG. 8A. In this case, the position of the analysis chip 10 is shifted in the x-axis direction as compared to the case where the analysis chip 10 is not shifted in the z-axis direction (indicated by a broken line in the drawing). However, even in this case, it is possible to dispose the analysis chip 10 at an appropriate measurement position by causing the conveyance stage 152 to move the chip holder 154 a predetermined distance, based on the detected position of the edge portion, as illustrated in FIG. 8B.

REFERENCE SIGNS LIST

10 analysis chip
20 prism
21 incident surface
22 film formation surface
23 output surface
30 metal film
40 flow path lid
41 flow path
42 spacer
70 temperature control unit
71 temperature control means
72 temperature sensor
73 blower means
100 SPFS device
110 excitation light irradiation unit
111 light source unit
112 angle adjustment mechanism
113 light source control part
120 excitation light detection unit
121 light receiving sensor
122 sensor control part
130 fluorescence detection unit
131 light receiving unit
132 position switching mechanism
133 sensor control part
134 lens
135 optical filter
136 lens
137 light receiving sensor
140 liquid feeding unit
141 syringe pump
142 syringe
143 liquid feeding pump drive mechanism
144 plunger
145 pipette tip
147 chemical liquid chip
150 conveyance unit
152 conveyance stage
154 chip holder
160 control processing part

The invention claimed is:

1. An analysis method for detecting an amount of a substance to be measured by irradiating an analysis chip containing the substance to be measured with detection light and detecting a quantity of light output from the analysis chip, the analysis method comprising:
   irradiating the analysis chip with the detection light while changing a relative position of the detection light with respect to the analysis chip, the detection light respectively irradiating an incident surface of the analysis chip, another surface adjacent to the incident surface, and a boundary position between the incident surface and the another surface during the changing of the relative position of the detection light with respect to the analysis chip, detecting reflected light from the incident surface of the analysis chip, and acquiring information on a position of the analysis chip from a relationship between a quantity of the reflected light detected and the relative position,
   determining that the analysis chip is abnormal in a case where a quantity of target reflected light is equal to or lower than a predetermined light quantity, the quantity of the target reflected light being a light quantity to be detected when the analysis chip is located at a position where a total beam diameter of the detection light is incident on the incident surface,
   determining whether an abnormality in the analysis chip can be eliminated when it is determined that the analysis chip is abnormal in the determining that the analysis chip is abnormal, wherein
   in the determining whether an abnormality in the analysis chip can be eliminated, it is determined that the abnormality can be eliminated if a difference between values of a maximum quantity and a minimum quantity of the target reflected light is equal to or lower than a predetermined rate of the maximum quantity, and it is determined that the abnormality cannot be eliminated if the difference between the values of the maximum quantity and the minimum quantity exceeds the predetermined rate of the maximum quantity.

2. The analysis method according to claim 1, wherein the predetermined light quantity is not less than 85% and not more than 95% of a theoretical value of a quantity of the reflected light to be originally detected in the determining that the analysis chip is abnormal.

3. The analysis method according to claim 2, wherein the abnormality in the analysis chip to be detected in the determining that the analysis chip is abnormal is any of: condensation formed on the incident surface; fogging of the incident surface; a scratch on the incident surface; and adhesion of dirt to the incident surface.

4. The analysis method according to claim 1, further comprising:
   eliminating the abnormality in the analysis chip when it is determined, in the determining whether an abnormality in the analysis chip can be eliminated, that the abnormality can be eliminated.

5. The analysis method according to claim 4, wherein
an abnormality elimination method in the eliminating includes at least one of a method of blowing warm air onto the analysis chip and a method of leaving the analysis chip for a predetermined period of time or more on a conveyance stage having a controlled temperature.

6. The analysis method according to claim 5, further comprising:
reacquiring a quantity of the target reflected light after the eliminating; and
determining whether the abnormality in the analysis chip has been eliminated, based on a value of the quantity of the target reflected light reacquired in the reacquiring.

7. The analysis method according to claim 6, wherein
when it is determined, in the determining whether the abnormality in the analysis chip has been eliminated, that the abnormality in the analysis chip has been eliminated, detection of the amount of the substance to be measured is performed.

8. The analysis method according to claim 4, wherein
when it is determined, in the determining whether the abnormality in the analysis chip has been eliminated, that the abnormality cannot be eliminated, there is performed any of:
notifying a user of that effect; interrupting detection of the amount of the substance to be measured; or displaying a note on the abnormality found in a detection result.

9. The analysis method according to claim 1, wherein
the abnormality in the analysis chip to be detected in the determining that the analysis chip is abnormal is any of: condensation formed on the incident surface; fogging of the incident surface; a scratch on the incident surface; and adhesion of dirt to the incident surface.

10. An analysis device for detecting an amount of a substance to be measured by irradiating an analysis chip containing the substance to be measured with the detection light and detecting a quantity of light output from the analysis chip, the analysis device comprising:
an irradiation part including a light source that irradiates the analysis chip including an incident surface and another surface adjacent to the incident surface with the detection light;
a conveyance part including a conveyance stage and a chip holder that changes a relative position of the detection light with respect to the analysis chip while irradiating the analysis chip by the irradiation part, the detection light respectively irradiating the incident surface of the analysis chip, the another surface, and a boundary position between the incident surface and the another surface during the changing of the relative position of the detection light with respect to the analysis chip;
a detection part including a first sensor and a sensor controller, wherein the sensor controller detects reflected light received by the first sensor from the incident surface of the analysis chip while the conveyance part changes the relative position and the irradiation part to irradiates the incident surface of the analysis chip and the another surface adjacent to the incident surface with the detection light;
a processor that functions as a position information acquisition part that acquires information on a position of the analysis chip from a relationship between a quantity of the reflected light detected and the relative position; and the processor further functions as an abnormality determination part that determines that the analysis chip is abnormal in a case where a quantity of target reflected light is equal to or lower than a predetermined light quantity, the quantity of the target reflected light being a light quantity to be detected when the conveyance part locates the analysis chip at a position where a total beam diameter of the detection light is incident on the incident surface, wherein
the abnormality determination part determines whether an abnormality in the analysis chip can be eliminated when it is determined that the analysis chip is abnormal, and
the abnormality determination part determines that the abnormality can be eliminated if a difference between values of a maximum quantity and a minimum quantity of the target reflected light is equal to or lower than a predetermined rate of a maximum quantity, and determines that the abnormality cannot be eliminated if the difference between the values of the maximum quantity and the minimum quantity exceeds the predetermined rate of the maximum quantity.

11. The analysis device according to claim 10, wherein
the predetermined light quantity is not less than 85% and not more than 95% of a theoretical value of a quantity of the reflected light to be originally detected when the analysis chip is located at the position where the total beam diameter of the detection light is incident on the incident surface.

12. The analysis device according to claim 10, further comprising:
a function of eliminating the abnormality in the analysis chip when the abnormality determination part determines that the abnormality can be eliminated.

13. The analysis device according to claim 12, further comprising at least one of:
a temperature controller that blows warm air onto the analysis chip; and a timer that measures time for determination as to whether the analysis chip has been left on a conveyance stage having a controlled temperature for a predetermined period of time.

14. The analysis device according to claim 12, wherein
the detection part detects a quantity of the target reflected light again after the abnormality in the analysis chip is eliminated, and
the abnormality determination part determines whether the abnormality in the analysis chip has been eliminated, based on a value of the quantity of the target reflected light detected again by the detection part.

15. The analysis device according to claim 14, wherein
detection of the amount of the substance to be measured is performed when the abnormality determination part determines that the abnormality in the analysis chip has been eliminated.

16. The analysis device according to claim 10, further comprising any of:
a notification part that notifies a user that the abnormality cannot be eliminated when determination to that effect is made by the abnormality determination part; an interruption instruction part that interrupts detection of the amount of the substance to be measured when the abnormality determination part determines that the abnormality cannot be eliminated; or a printing part that displays a note on the abnormality found in a detection result when the abnormality determination part determines that the abnormality cannot be eliminated.

17. The analysis device according to claim 10, wherein the abnormality in the analysis chip to be detected in the abnormality determination part is any of: condensation formed on the incident surface; fogging of the incident surface; a scratch on the incident surface; and adhesion of dirt to the incident surface.

\* \* \* \* \*